United States Patent
Huang et al.

(10) Patent No.: US 8,922,651 B2
(45) Date of Patent: Dec. 30, 2014

(54) MOVING OBJECT DETECTION METHOD AND IMAGE PROCESSING SYSTEM FOR MOVING OBJECT DETECTION

(75) Inventors: Tai-Hui Huang, Yunlin County (TW); Tsung-Chan Li, Taoyuan County (TW); Wen-Hao Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 868 days.

(21) Appl. No.: 13/086,178

(22) Filed: Apr. 13, 2011

(65) Prior Publication Data

US 2012/0154580 A1 Jun. 21, 2012

(30) Foreign Application Priority Data

Dec. 20, 2010 (TW) ................................ 99144711 A

(51) Int. Cl.
*G06T 7/20* (2006.01)

(52) U.S. Cl.
CPC ..... *G06T 7/2006* (2013.01); *G06T 2207/20144* (2013.01); *G06T 2207/20148* (2013.01)
USPC .......................................... 348/143; 348/699

(58) Field of Classification Search
None
See application file for complete search history.

(56) References Cited

U.S. PATENT DOCUMENTS

| | | | |
|---|---|---|---|
| 6,687,405 B1 | 2/2004 | Trew et al. | |
| 7,085,401 B2 | 8/2006 | Averbuch et al. | |
| 8,000,498 B2 * | 8/2011 | Shih et al. | 382/103 |
| 8,463,050 B2 * | 6/2013 | Barlaud et al. | 382/219 |
| 8,538,070 B2 * | 9/2013 | Chen | 382/103 |
| 2003/0112870 A1 | 6/2003 | Fukuda et al. | |
| 2010/0171819 A1 * | 7/2010 | Tolkowsky et al. | 348/65 |
| 2010/0195867 A1 * | 8/2010 | Kipman et al. | 382/103 |

(Continued)

FOREIGN PATENT DOCUMENTS

| | | |
|---|---|---|
| CN | 101098462 A | 1/2008 |
| CN | 101442680 A | 5/2009 |
| TW | 200906167 | 2/2009 |
| TW | 200828174 | 5/2010 |

OTHER PUBLICATIONS

Mei-Chun-Kuo (student), Dr. Chien Hsiang Huang (advisor), "The Visual Surveillance Systems based on the Variance of Video Information", A Thesis Submitted to Department of Information Engineering I-Shou University in Partial Fulfillment of the Requirements in Information Engineering, Jul. 2010, 26 pages.

(Continued)

*Primary Examiner* — Jay Au Patel
*Assistant Examiner* — Reza Aghevli
(74) *Attorney, Agent, or Firm* — Muncy, Geissler, Olds & Lowe, P.C.

(57) ABSTRACT

A moving object detection method and an image processing system thereof are provided. First, a pixel-wise distance of a received image to a reference image is computed to obtain a distance map. A histogram analysis is performed on the distance map to obtain a distance distribution. An entropy value of the distance distribution is computed and a peak distance value which is with a maximum occurrence probability in the distance distribution is searched out. Then, by using a mapping rule, the entropy value and the peak distance value are transformed into a decision threshold value. The decision threshold value is applied in classifying the pixels of the distance map into a group of foreground attributes and a group of background attributes and thereby moving objects in the current image are obtained.

13 Claims, 5 Drawing Sheets

(56) References Cited

U.S. PATENT DOCUMENTS

2010/0195869 A1* 8/2010 Geiss .................... 382/103
2010/0201820 A1* 8/2010 Lopota et al. ............ 348/152
2010/0290668 A1* 11/2010 Friedman et al. ......... 382/103
2010/0303289 A1* 12/2010 Polzin et al. ............ 382/103
2010/0315505 A1* 12/2010 Michalke et al. ........ 348/118

OTHER PUBLICATIONS

Shao-Hua Liu, et al., "A Robust and Efficient Video Moving Object Detection and Tracking Algorithm", ACTA Automatica Sinica, vol. 35, No. 8, Aug. 2009, pp. 1055-1062.

Rosin, et al., "Evaluation of global image thresholding for change detection", Pattern Recognition Letters 24 (2003), pp. 2345-2356.

Medina-Carnicer, et al., "Evaluation of global thresholding techniques in non-contextual edge detection", Pattern Recognition Letters 26 (2005), pp. 1423-1434.

Jing, et al., "Foreground motion detection by difference-based spatial temporal entropy image", School of Computer Engineering, Nanyang Technological University, Singapore 639798 (2004), 4 pages.

Radke, et al., "Image change detection algorithms: A systemic survey", IEEE Transactions on image processing, vol. 14, No. 3, Mar. 2005, pp. 294-307.

Sezgin, et al., "Survey over image thresholding techniques and quantitative performance evaluation", Journal of Electronic Imaging 13(1), Jan. 2004, pp. 146-168.

Rosin, "Thresholding for change detection", Department of Information and Systems and Computing, Brunel University, Uxbridge, Middlesex UB8 3PH, UK, Jan. 1998, 6 pages.

* cited by examiner

MOVING OBJECT DETECTION METHOD AND IMAGE PROCESSING SYSTEM FOR MOVING OBJECT DETECTION

CROSS REFERENCE TO RELATED APPLICATIONS

This application claims priority of Taiwan Patent Application No. 099144711, filed on Dec. 20, 2010, the entirety of which is incorporated by reference herein.

BACKGROUND OF THE INVENTION

1. Field of the Invention

The disclosure relates to an image processing system, and in particular relates to a moving object detection technique for a video sequence.

2. Description of the Related Art

Moving object detection is an important technique for developing an intelligent video surveillance system in many applications. For example, in the security monitoring domain, it is not necessary for a security person to fix his eyes on a monitor always since the surveillance system will produce an alarm signal to him/her when a moving object is detected in a monitored region. In the applications in the medical industry, a remote medical care system with the ability of moving object detection will notify the medical care personnel to take care of the patient when some unusual behaviors, such as falling on the floor or rising from the bed, are detected by the system.

In general, the technique of moving object detection can be achieved through checking a distance map that is consisted of pixel-wise intensity distances between a received image and a reference image. The reference image can be either a background scene or a last adjacent image, which is designed according to the purpose of the system. For example, the moving object detection using the last adjacent image as the reference is generally used for object motion analysis. The threshold value for the distance checking affects the accuracy of moving object detection directly and has to be adaptively changed for different illumination conditions and cameras. The threshold value can be set manually by skilled person when deploying the system. However, the cost of manually setting is high for large scale deployment and the threshold value is fixed after the setting process so that the system can not adapt to the illumination change in some applications.

To reduce the cost of manually setting and to improve the robustness, P. L. Rosin, etc. (Pattern Recognition Letters 24, 2003, pp. 2345-2356) apply a global thresholding technique that is originally developed for image segmentation to obtain a threshold value for moving object detection. Many thresholding techniques that are proposed based on different assumptions of intensity distributions of pixels in an image have been evaluated experimentally. As shown in the experiments, the accuracies of the moving object detection using the thresholding technique of the image segmentation not only fluctuate significantly, but also can become lower than those of the manually setting even under steady illumination condition. The results can be explained by the assumption mismatch that is caused by the significant difference between the intensity distributions and the distance distributions of pixels in an image.

A system providing an adaptive thresholding for moving object detection but without suffering from accuracy degradation is desired.

BRIEF SUMMARY OF THE INVENTION

A moving object detection method for a video sequence and an image processing system using the same are disclosed.

The disclosed moving object detection method includes the following steps. A histogram analysis is performed on a distance map that is consisted of pixel-wise intensity distances between a current image and a reference image and thereby an entropy value and a peak distance value of the distance distribution are obtained. By using a pre-defined mapping rule, the entropy value and the peak distance value are transformed into a decision threshold value. According to the decision threshold value, pixels of the distance map are classified into a group of foreground attributes and a group of background attributes, and moving objects of the current image are obtained accordingly.

The disclosed image processing system includes a distance distribution generation module, an entropy value extraction module, a peak distance value searching module, a decision threshold generation module, and a foreground/background separation module. The distance distribution generation module performs a histogram analysis on a distance map which is formed by pixel-wise distance between a current image and a reference image, to obtain a normalized histogram as the distance distribution thereof. The entropy value extraction module computes an entropy value of the distance distribution. The peak distance value searching module searches a distance value which is with a maximum occurrence probability in the distance distribution. The decision threshold generation module obtains a decision threshold value by a transformation of the entropy value and the peak distance value using a mapping rule. According to the decision threshold value, the foreground/background separation module classifies the pixels of the distance map into a group of foreground attributes and a group of background attributes, to obtain moving objects of the current image accordingly.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The disclosed techniques may be applied in processing a video sequence, to separate the foreground and the background of an image and thereby obtain moving objects of the video sequence.

Figure 1:
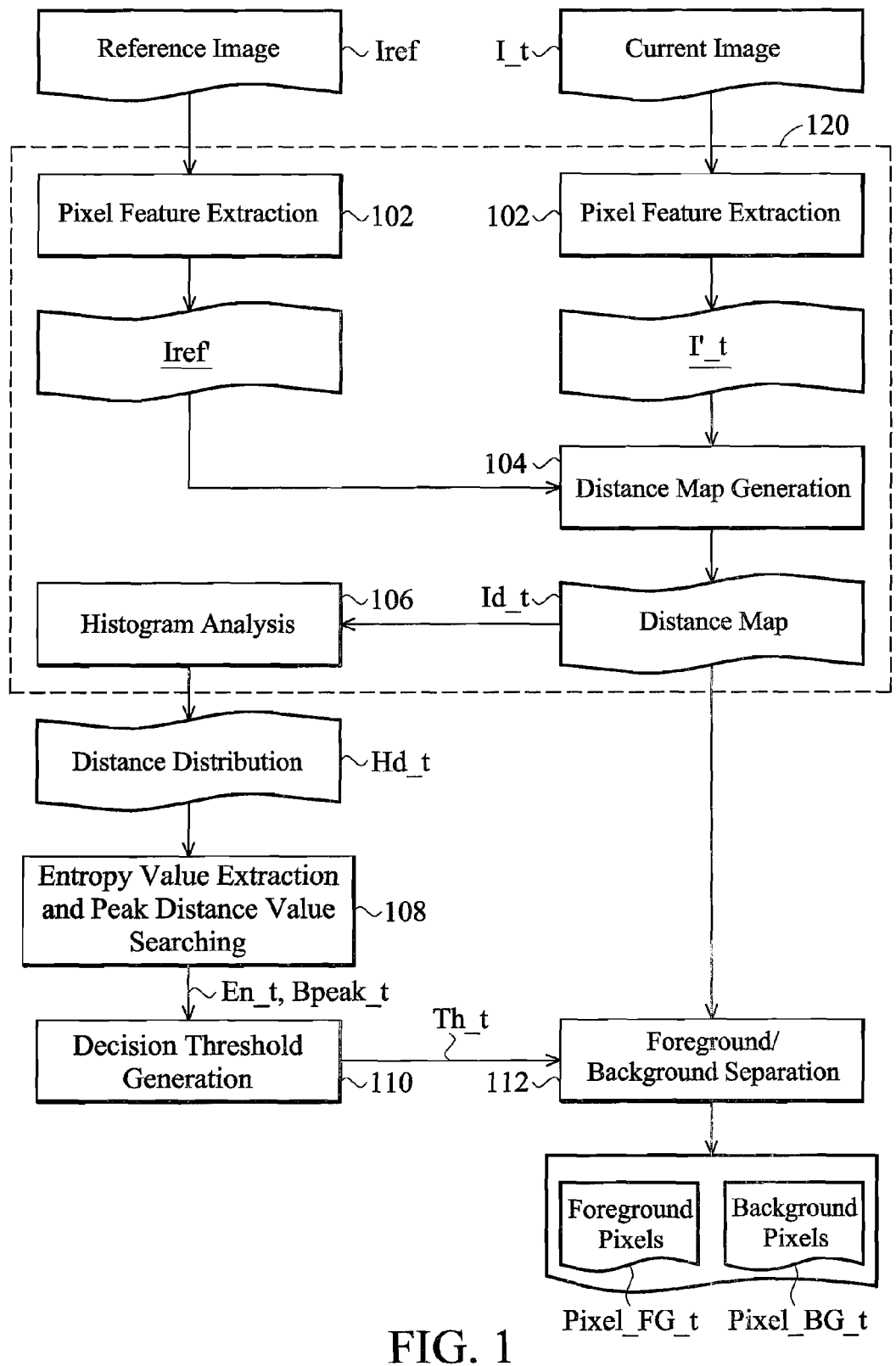
FIG. 1 illustrates a foreground/background separating technique, which is applied in the moving object detection technology of the application.

FIG. 1 illustrates a foreground/background separating technique in accordance with an exemplary embodiment of the invention. This method retrieves two images from the video sequence: one is the current image (labeled as I_t, where t represents the time index), and the other is a reference image Iref. The reference image Iref may be a last adjacent image (i.e., at time index t−1, just before the current image I_t). In some embodiments, the background scene is available and is adopted as the reference image Iref.

The current image I_t and the reference image Iref are obtained from a camera. In the blocks of 102, pixel feature extractions are performed on the two images I_t and Iref to obtain image data I'_t and Iref', respectively. The feature extraction in the blocks of 102 can be a transformation between two color spaces or from a color space into a texture domain. For example, pixels in I_t and Iref are expressed in the RGB color space, while pixels in I'_t and Iref' can be expressed in the RGB, or YUV color space, or by grey level, or in a horizontal-vertical gradient vector field, etc. Note that the expression of I'_t and Iref' may be obtained by any pixel feature extraction techniques but not limited to the transformations as mentioned above.

The block 104 provides a distance map generation procedure, which generates a distance map Id_t based on the image data I'_t extracted from the current image I_t and the image data Iref' extracted from the reference image Iref. The distance map generation in the block 104 may be implemented by various formulas.

In the case wherein the image data I'_t and Iref' are expressed in the RGB color space, all three color components, red (R), green (Green) and blue (B) are taken into account to compute a distance value d_t(x, y) of a pixel at location (x, y), $$d\_t(x, y)=|I'\_t(x,y,R)-Iref'(x,y,R)|+|I'\_t(x,y,G)-Iref'(x,y,G)|+|I'\_t(x,y,B)-Iref'(x,y,B)|,$$

or, in the other embodiment, each color component is squared before being summed up:

$$d\_t(x, y)=|I'\_t(x,y,R)-Iref'(x,y,R)|^2+|I'\_t(x,y,G)-Iref'(x,y,G)|^2+|I'\_t(x,y,B)-Iref'(x,y,B)|^2.$$

The distance value d_t(x,y) is obtained from every pixel and thereby the distance map Id_t is obtained.

In the case wherein the image data I'_t and Iref' are represented by grey level, "brightness" is the only feature that should be considered. A distance value d_t (x, y) of a pixel at (x, y) is computed by the following function:

$$d\_t(x, y)=|I'\_t(x,y)-Iref'(x,y)|,$$

or, in another embodiment, the brightness distance is further squared:

$$d\_t(x, y)=|I'\_t(x,y)-Iref'(x,y)|^2.$$

The distance value d_t(x,y) is obtained from every pixel and thereby the distance map Id_t is obtained.

In the case wherein the image data I'_t and Iref' are expressed in the texture domain, for instance, two gradient components in the vertical direction (v) and in the horizontal direction (h) are taken into account in computing a distance value d_t(x, y) of a pixel at (x, y), $$d\_t(x, y)=|I'\_t\_v(x,y)-Iref'\_v(x,y)|+|I'\_t\_h(x,y)-Iref'\_h(x,y)|,$$

or, in the other embodiment, each difference component is squared before being summed up:

$$d\_t(x, y)=|I'\_t\_v(x,y)-Iref'\_v(x,y)|^2+|I'\_t\_h(x,y)-Iref'\_h(x,y)|^2.$$

The distance value d_t(x,y) is obtained from every pixel and thereby the distance map Id_t is obtained.

Note that the aforementioned pixel feature extraction technologies are not meant to limit the generation of the distance map Id_t. The distance map Id_t may be generated by any well-known distance computation technique.

Figure 2:
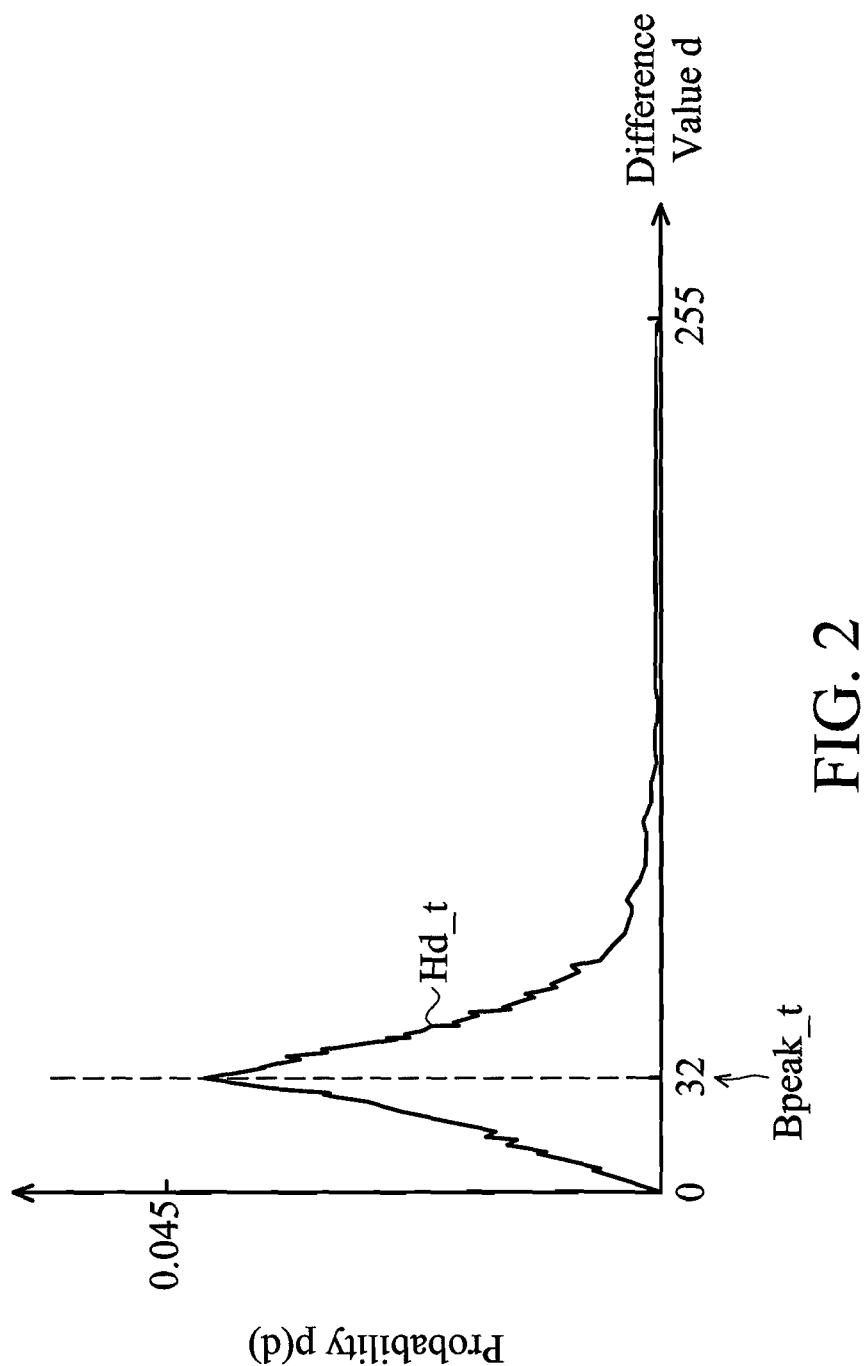
FIG. 2 shows an example of distance distribution by a normalized histogram Hd_t.

In the block 106, a histogram analysis is performed on the distance map Id_t to obtain a distance distribution (may be represented by a normalized histogram) Hd_t. FIG. 2 shows one example of the histogram, which is regarded as the distance distribution Hd_t. The horizontal axis denotes the distance value d in the range from 0 to 255 while the vertical axis denotes the probability of distance value d, p(d).

In the block 108, an entropy value extraction and a peak distance value searching are performed to analyze the distance distribution Hd_t to obtain an entropy value En_t and a peak distance value Bpeak_t. Referring to the distance distribution Hd_t shown in FIG. 2, the entropy value En_t may be computed according to the formula, $$En = -\sum_{d=0}^{255} p(d) \cdot \log p(d),$$

where p(d) is obtained by dividing the occurrence frequency of distance value d to a total number of pixels, and the peak distance value Bpeak_t is 32 in the example of FIG. 2.

According to the entropy value En_t and the peak distance value Bpeak_t of the distance distribution Hd_t, the block 110 provides a foreground/background decision threshold generation to obtain a decision threshold value Th_t.

The block 112 provides a foreground/background separation procedure. According to the decision threshold value Th_t obtained by the generation of the block 110, the pixels of the distance map Id_t are divided into two groups: the first group, in which each pixel corresponds to a distance value smaller than the decision threshold value Th_t; and the second group, in which each pixel corresponds to a distance value greater than or equal to the decision threshold value Th_t. The pixels of the first group contain background attributes and are termed as background pixels Pixel_BG_t. The pixels of the second group contain foreground attributes and are termed as foreground pixels Pixel_FG_t. Referring to the current image I_t, the background pixels Pixel_BG_t show the background while the foreground pixels Pixel_FG_t show the foreground. The foreground may contain the moving objects. The foreground/background separating procedure introduced in FIG. 1 may be applied for moving object detection in a video sequence.

The decision threshold generation of the block 110 may be implemented by various methods.

In an exemplary embodiment, a mapping rule is adopted to transform the statistical analysis result of the distance map Id_t into the decision threshold value Th_t. The decision threshold generation of the block 110 transforms the entropy value En_t and the peak distance value Bpeak_t, using a mapping rule, to obtain the decision threshold value Th_t.

For an electronic product with the ability of moving object detection, the mapping rule may be designed during the manufacturing of the electronic product. A developer may collect several training videos as training data, and obtain the mapping rule from the training data. The training videos may be recorded in different environmental brightness conditions and the recorded video contents may be of different complexities.

Figure 3:
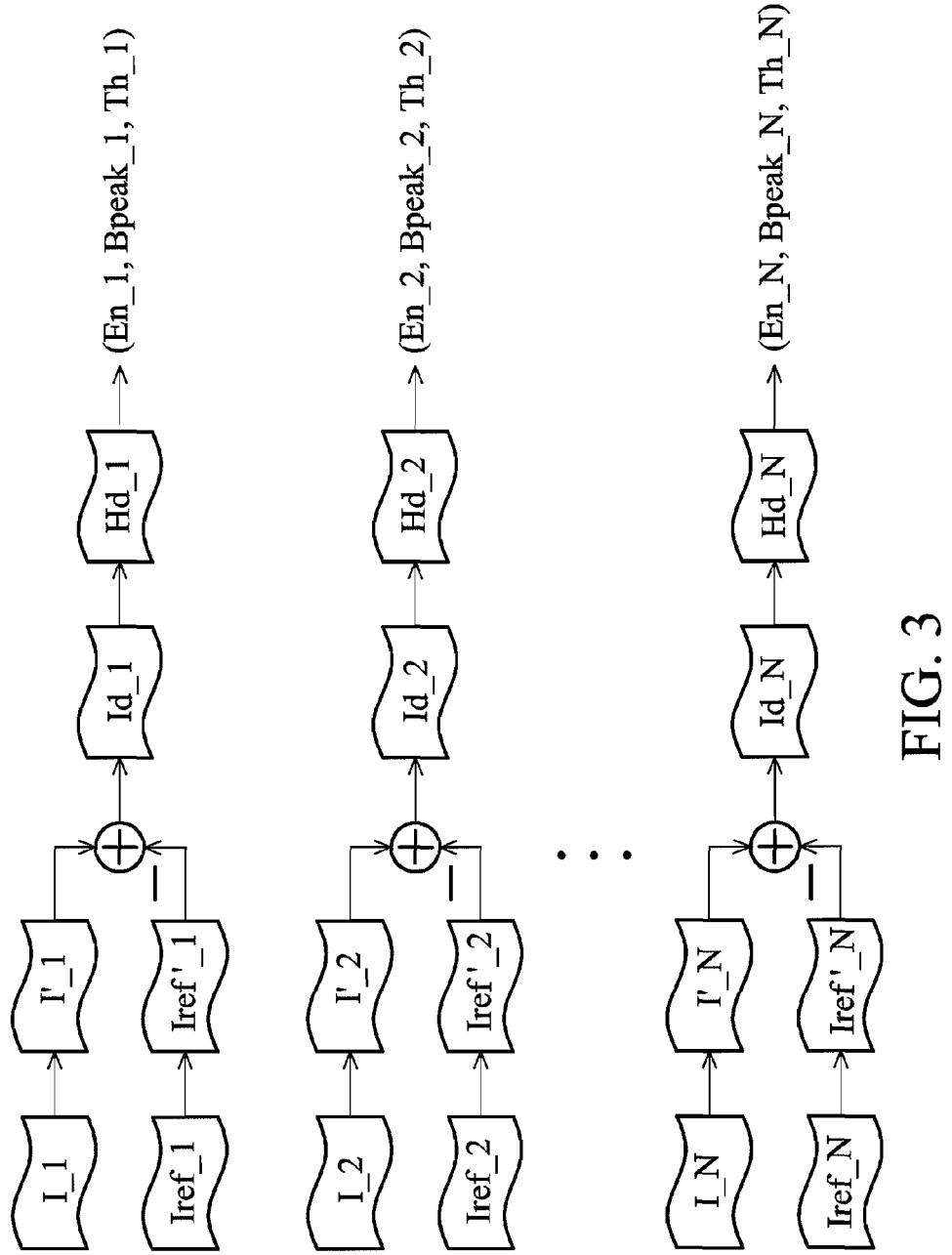
FIG. 3 illustrates a data preparation for training a mapping rule in accordance with an exemplary embodiment of the invention.

FIG. 3 illustrates a procedure of collecting data for training the mapping rule. As shown, a plurality of images I_1~I_N and a plurality of correspondent reference images Iref_1~IrefN are collected from the videos for training. By using the aforementioned pixel feature extraction technique, image data I'_1~I'N are extracted from the training images I_1~I_N and image data Iref'_1~Iref'_N are extracted from the reference images Iref_1~Iref_N. By using the aforementioned distance map generation procedure, distance maps Id_1~Id_N are obtained. By using the aforementioned histogram analysis procedure, distance distributions (may be represented by normalized histograms) Hd_1~Hd_N are obtained from the distance maps Id_1~Id_N. From each distance distribution Hd_i (i=1~N), an entropy value En_i and a peak distance value Bpeak_i are obtained by using the technique in the block 108. For each image I_i (i=1~N), an optimum decision threshold value Th_i may be obtained by manually setting, which results in the maximum accuracy on the moving object detection in the image I_i.

In one exemplary embodiment, for each distance histogram Hd_i, an unbiased decision threshold value UBTH_i may be computed in accordance with the following formula:

$$UBTh\_i = Th\_i - Bpeak\_i.$$

The relationship between the unbiased decision threshold value UBTh_1~UBTh_N and entropy values En_1~En_N obtained from the images I_1~I_N may be investigated by a first-order linear regression analysis, in which a constant K of relationship coefficient has to be estimated to form the mapping rule. The first-order linear regression analysis may be implemented by the following formula, $$K = \begin{bmatrix} \sum_{i=1}^{N} En\_i^2 & -\sum_{i=1}^{N} En\_i \\ -\sum_{i=1}^{N} En\_i & N \end{bmatrix} \begin{bmatrix} \sum_{i=1}^{N} UBTh\_i \\ \sum_{i=1}^{N} En\_i \cdot UBTh\_i \end{bmatrix} \cdot \frac{1}{N \sum_{i=1}^{N} En\_i^2 - \left(\sum_{i=1}^{N} En\_i\right)^2},$$

and the mapping rule may be defined as:

$$Th\_t = K \cdot En\_t + Bpeak\_t \quad \text{(equation 1)}.$$

Referring to FIG. 1, the decision threshold generation of the block 110 may transform the entropy value En_t and peak distance value Bpeak_t obtained in the block 108 by using the equation (1), so that the decision threshold value Th_t is generated and is applied to the foreground/background separation of the block 112.

Figure 4:
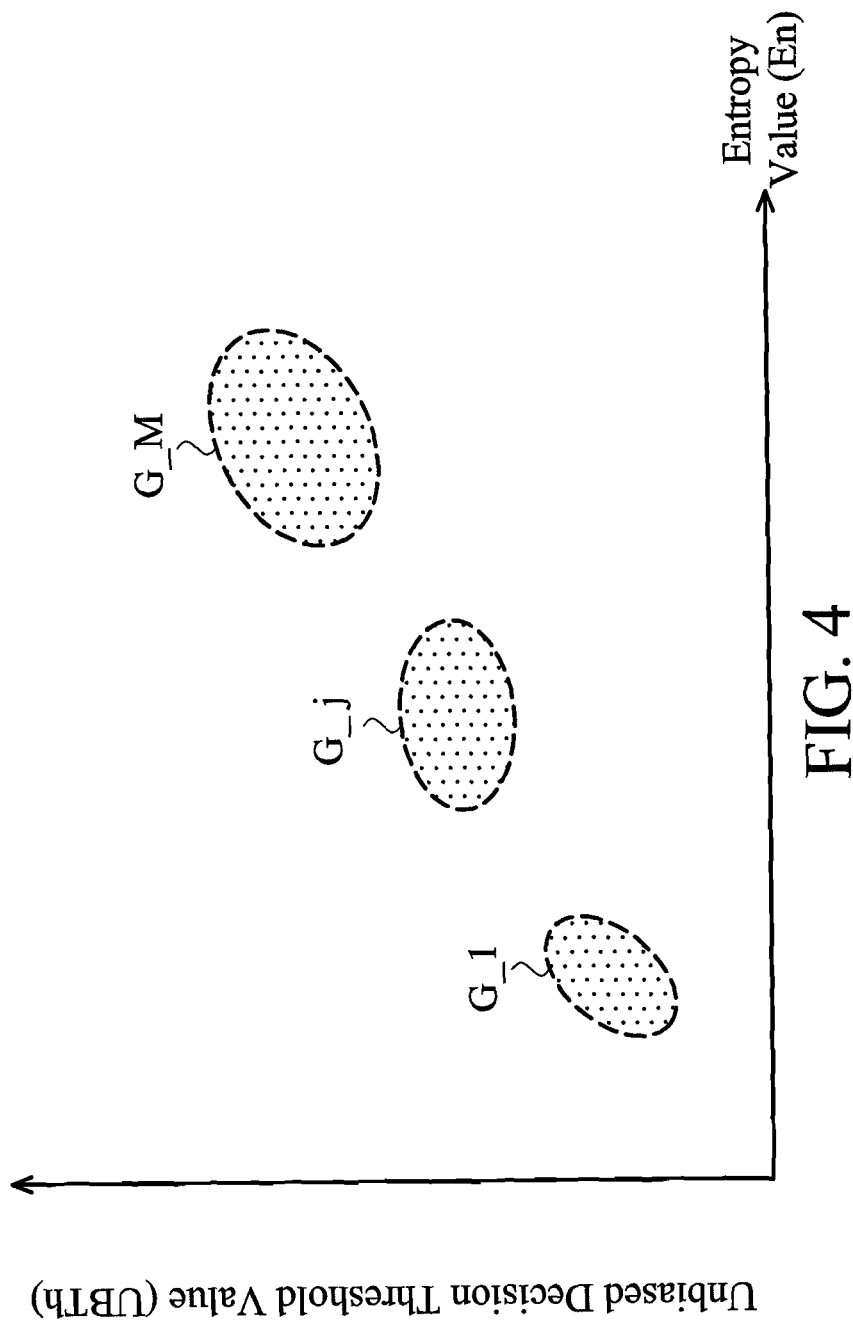
FIG. 4 illustrates the groups of training data of the mapping rule.

The training procedure of the mapping rule may be implemented by other techniques. For example, as shown in FIG. 4, the scatter plot of the entropy values En_1~En_N and the unbiased decision threshold values UBTh_1~UBTh_N may form several groups G_1 ... G_j ... G_M. Since the centers of these groups may be not placed in a straight line, a first-order linear regression analysis on the whole data will produce significant errors. To alleviate the errors, one exemplary embodiment of the invention partitions the En_i and UBTH_i paired data into M clusters in advance by using a conventional vector quantization technique, and the cluster center vectors, (En_j, UBTH_j) for j=1~M, will be taken as a table describing the mapping relationship between the entropy value En_j and the decision threshold value UBTH_j. Referring to FIG. 1, the decision threshold generation in the block 110 is performed by checking the table to get an unbiased decision threshold value UBTH_j indexed by the entropy value En_j which is nearest to the entropy value En_t obtained in the block 108. The peak distance value Bpeak_t of the distance distribution Hd_t is added to the unbiased decision threshold value UBTh_j, so that the decision threshold value Th_t is obtained and is applied to the foreground/background separation of the block 112.

The moving object detection method may be applied in a system or a device to provide functionalities of image processing. Referring to FIG. 1, the procedures included in the block 120 may be implemented as a distance distribution generation module, which performs histogram analysis on a distance map Id_t between a current image I_t and a reference image Iref and thereby obtains a distance distribution (may be represented by a normalized histogram) Hd_t. The entropy value extraction of the block 108 may be implemented as an entropy value extraction module, to compute an entropy value of the distance distribution Hd_t. The peak distance value searching of the block 108 may be implemented as a peak distance value searching module, to obtain a peak distance value Bpeak_t of the distance distribution Hd_t. The decision threshold generation of the block 110 may be implemented as a decision threshold generation module, to obtain a decision threshold value Th_t based on the entropy value En_t and the peak distance value Bpeak_t. The foreground/background separation of the block 112 may be implemented as a foreground/background separation module, to classify the distance map Id_t, based on the decision threshold value Th_t, into two groups for obtaining foreground pixels Pixel_FG_t and background pixels Pixel_BG_t, respectively. The foreground/background separation procedure is applied in moving object detection or motion analysis.

The aforementioned modules may be realized by software, hardware or software and hardware codesign. In some embodiments, the modules are realized by an embedded system. The embedded system may be built within a video capturing device, so that the video capturing device is capable of moving object detection or motion analysis. In a medical or a security surveillance system, the modules may be realized by a central host computer, so that a surveillance system is capable of performing moving object detection.

Figure 5:
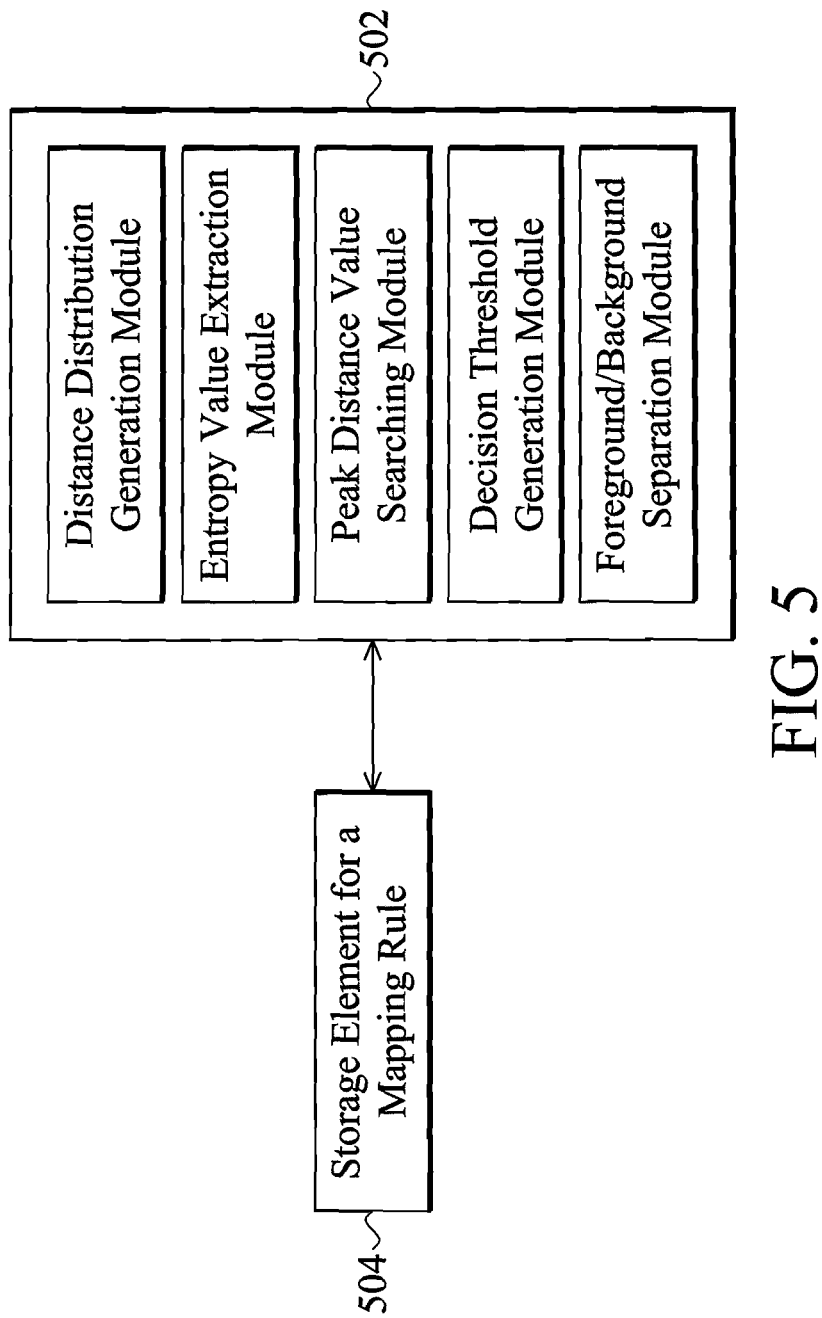
FIG. 5 depicts an image processing system in accordance with one exemplary embodiment of the invention.

FIG. 5 further illustrates an image processing system in accordance with an exemplary embodiment of the invention. The aforementioned modules are depicted within the block 502 and a storage element 504 storing the mapping rule is introduced. The storage element 504 is designed to store the training result such as the constant K or the look-up table. Based on the information stored in the storage element 504, a decision threshold value Th_t may be generated by the decision threshold generation module of the block 502, to be utilized by the foreground/background separation module which is also contained in the block 502. The storage element 504 and the modules of the block 502 may be built within an embedded system of a video capturing device. Or, the storage element 504 and the modules of the block 510 may be built within a central host computer of a surveillance system.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A moving object detection method for a video sequence, comprising:
    performing a histogram analysis on a distance map of a current image and computing an entropy value and a peak distance value of the distance distribution obtained from the histogram analysis;
    generating a decision threshold value by a transformation of the entropy value and the peak distance value using a mapping rule; and classifying pixels of the distance map according to the decision threshold value, to separate a group of pixels which belongs to moving objects or foreground attributes from the current image, wherein the mapping rule is a pre-defined formula for generating the decision threshold value or is represented with a predetermined look-up table which defines a relationship between an entropy value and an unbiased decision threshold value.

2. The method as claimed in claim 1, further comprising a step of computing distance values to form the distance map, wherein, the distance value for each pixel is a summation of the absolute or squared difference components between the current image and a reference image.

3. The method as claimed in claim 1, wherein the entropy value and the peak distance value are regarded as two inputs of the mapping rule, and the mapping rule is a pre-defined formula for generating the decision threshold value.

4. The method as claimed in claim 3, wherein the step of generating the decision threshold value by the mapping rule comprises:

multiplying the entropy value with a predetermined constant to obtain a product and then adding the peak distance value to the product to generate the decision threshold value.

5. The method as claimed in claim 1, wherein the mapping rule is represented with a predetermined look-up table which defines a relationship between an entropy value and an unbiased decision threshold value.

6. The method as claimed in claim 5, wherein the step of generating the decision threshold value by using the mapping rule comprises:

checking the look-up table in accordance with the entropy value obtained from the distance distribution to obtain the unbiased decision threshold value corresponding thereto and then adding the peak distance value obtained from the distance distribution to the unbiased decision threshold value to generate the decision threshold value.

7. An image processing system capable of detecting moving objects in a video sequence, comprising:

a distance distribution generation module, performing a histogram analysis on a distance map which is formed by pixel-wise distance between a current image and a reference image to generate a distance distribution;

an entropy value extraction module, computing an entropy value of the distance distribution;

a peak distance value searching module, searching a distance value which is with a maximum occurrence probability in the distance distribution;

a decision threshold generation module, transforming the entropy value and the peak distance value by using a mapping rule to generate a decision threshold value;

a foreground/background separation module, classifying pixels of the distance map according to the decision threshold value, to obtain a first group of pixels of foreground attributes and a second group of pixels of background attributes, for obtaining moving objects within the current image; and a storage element, storing one of a predetermined constant, wherein the predetermined constant determines the mapping rule and a look-up table which contains a mapping rule between the entropy value and the unbiased decision threshold value.

8. The image processing system as claimed in claim 7, further comprising an embedded system, wherein the embedded system implements the distance distribution generation module, the entropy value extraction module, the peak distance value searching module, the decision threshold generation module, and the foreground/background separation module.

9. The image processing system as claimed in claim 8, further comprising a video capturing device, wherein the embedded system is built in the video capturing device.

10. The image processing system as claimed in claim 7, further comprising a central unit, wherein the central unit implements the distance distribution generation module, the entropy value extraction module, the peak distance value searching module, the decision threshold generation module, and the foreground/background separation module.

11. The image processing system as claimed in claim 10, further comprising a surveillance system, wherein the surveillance system includes the central unit.

12. The image processing system as claimed in claim 7, further comprising:

a storage element, storing a predetermined constant, wherein the predetermined constant determines the mapping rule, wherein the decision threshold generation module accesses the predetermined constant from the storage element and multiplies the entropy value by the predetermined constant to obtain a product and then adds the peak distance value to the product to generate the decision threshold value.

13. The image processing system as claimed in claim 7, further comprising:

a storage element, storing a look-up table which contains a mapping rule between the entropy value and the unbiased decision threshold value, wherein the decision threshold generation module checks the look-up table in accordance with the entropy value to obtain an unbiased decision threshold value corresponding thereto, and then adds the peak distance value to the unbiased decision threshold value to generate the decision threshold value.

* * * * *